UNITED STATES PATENT OFFICE.

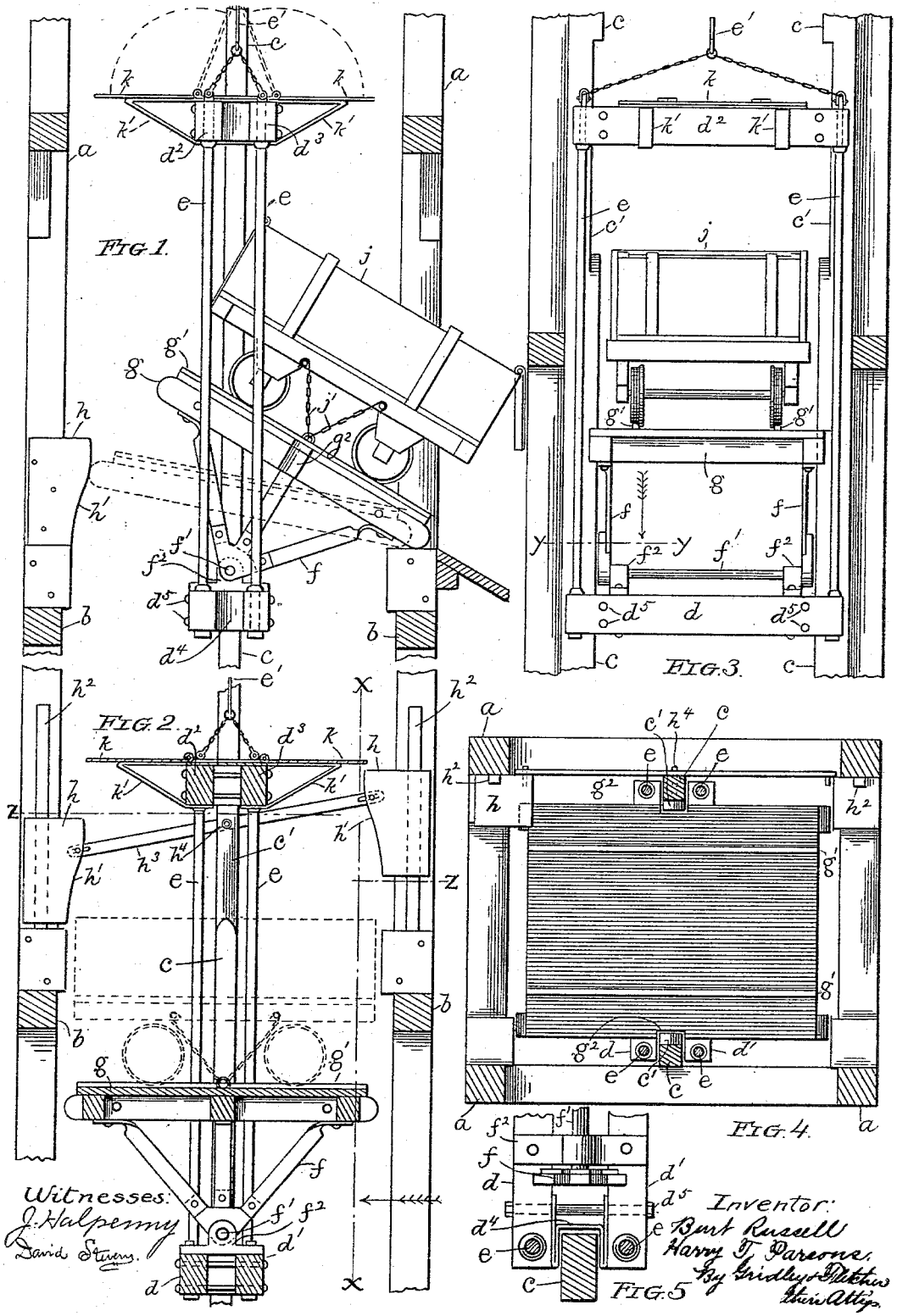

BURT RUSSELL AND HARRY T. PARSONS, OF BRAIDWOOD, ILLINOIS.

AUTOMATIC DUMPING-CAGE.

SPECIFICATION forming part of Letters Patent No. 412,042, dated October 1, 1889.

Application filed May 21, 1889. Serial No. 311,547. (No model.)

*To all whom it may concern:*

Be it known that we, BURT RUSSELL and HARRY T. PARSONS, of Braidwood, in the county of Will and State of Illinois, have invented certain new and useful Improvements in Automatic Dumping-Cages, of which the following is a full, clear, and exact description, reference being had to the accompanying drawings, forming a part of this specification, in which like letters of reference in the different figures indicate like parts.

The object of our invention is to so construct a dumping-cage for use in mining and other shafts that the platform may be maintained in a horizontal position while in the shaft without the use of corner-posts, and that it may be dumped in either direction from the top of the shaft.

A further object is to construct the top of said cage so as to enable it to be employed for conveying timbers in and out of the shaft when desired, all of which is hereinafter more particularly described, and definitely pointed out in the claims.

Figure 1 in the drawings represents a side view of a cage and a portion of a shaft, partly in section, said cage embodying the features of our invention. Fig. 2 is a like side view in vertical section, the cage being represented in its normal position. Fig. 3 is a sectional view taken upon the line $x$ $x$, Fig. 2, viewed in the direction of the arrow there shown. Fig. 4 is a plan view in section, taken upon the line $z$ $z$, Fig. 2; and Fig. 5 is a detail view taken upon the line $y$ $y$, Fig. 3, viewed as indicated by the arrow there shown.

Referring to said drawings, $a$ represents the frame-work constituting the usual tower above the mouth of the shaft, $b$ the horizontal timbers at the entrance of the shaft or upon the level of the dump, and $c$ $c$ the guide-timbers extending down upon opposite sides of the shaft.

The frame of our improved cage consists of two horizontal cross-bars $d$ $d'$ at the bottom, and two like bars $d^2$ $d^3$ at the top, which are arranged parallel to each other, respectively, and separated by means of bent irons or shoes $d^4$, (better shown in Fig. 5,) which are secured in place by means of bolts $d^5$. Thus it will be seen that the surface between the respective ends of said cross-bars $d$ $d'$ and $d^2$ $d^3$ is lined and protected by said irons $d^4$ from wear incident to contact with the guide-timbers $c$ $c$, which project therein, as clearly shown in the drawings. The cross members formed by said horizontal bars $d$ $d'$ at the bottom and $d^2$ $d^3$ at the top are connected by means of vertical bars $e$ $e$ upon the respective ends, thus forming a rigid frame, which is suspended loosely within the shaft by means of the usual cable $e'$, which is trained over a pulley and connected with a source of power.

Supported upon brackets $f$ $f$, which are attached rigidly to the bottom thereof, is a platform $g$, having rails or tracks $g'$ $g'$ thereon. The lower ends of said brackets are connected by means of a shaft $f'$, which is loosely mounted in bearings $f^2$ $f^2$, bolted to the cross-bars $d$ $d'$. Upon the respective sides of the platform $g$ are notches $g^2 g^2$, Fig. 4, with which the guides $c$ $c$ normally engage, so that the platform $g$ is thereby retained in a horizontal position; but except for being so supported the platform is free to tilt forward or back for the purpose of dumping its load, as hereinafter stated. A short distance above the mouth of the shaft the guide-timbers $c$ $c$ are cut away sufficiently, as shown at $c'$ $c'$, so as not to enter the notches $g^2$ $g^2$ in the pivoted platform, thus leaving said platform free to tilt forward or back, according as its movement may be directed when the cage is elevated to the level of the dump.

For the purpose of initiating the dumping movement of the platform, a block $h$, having an inwardly-inclined surface $h'$, may be attached to one of the posts $a$, the attachment being preferably rigid, as shown in Fig. 1, if it is intended to have the platform dump only in one direction; but if it is desirable to reverse the movement blocks may be placed opposite each other upon both of the posts $a$, as shown in Figs. 2 and 3, where they may be loosely secured upon vertical guides $h^2$ $h^2$, and each loosely connected to a cross-bar $h^3$, which is pivoted at $h^4$ upon the guide-post $c$ in such a way that when one of said blocks is lowered in position to engage the end of said platform the other is raised, as shown at the right in Fig. 2, sufficiently to allow the platform to pass beneath it when tilted. In Fig. 1 the dotted lines represent the platform in engagement with the block $h$ and in the act of being tilted, while the full lines indicate the extent of its incline.

A car $j$ is represented as being temporarily secured to the platform by means of chains $j'\ j'$, hooked thereto.

The end boards of the car are hinged, as shown, to permit the load to be released.

To the top of the cage we attach hinged covers $k\ k$, which are normally supported in a horizontal position by means of brackets $k'\ k'$, but may be thrown back, as indicated in dotted lines in Fig. 1. This device serves, when in its normal position, to protect passengers from injury from stones and other things falling into the shaft, while it permits the transport of timbers of greater length than the height of the cage.

It is obvious that the car may be secured upon the platform in various ways—such, for example, as placing clogs beneath the wheels; but the manner shown is simple and effectual.

Having thus described our invention, we claim—

1. In an automatic dumping-cage, the combination of the cage-frame, vertical guides having cut-away portions $c'$ and arranged in the shaft upon opposite sides of said frame, a pivotal platform the axis of which is arranged in the plane of said guides, there being notches formed in said platform to receive said guides, and means, such as the cut-away portions $c'$, at or near the dump-level, whereby said platform is permitted to tilt upon its axis, substantially as shown and described.

2. The combination, in a dumping-cage, of the tilting platform $g$, provided with notches $g^2\ g^2$, guide-posts $c\ c$, having cut-away portions $c'\ c'$ at or near the dump-level, and means, such as the inclined-faced block, for tilting said platform in a given direction when opposite to said cut-away portions $c'\ c'$, substantially as shown and described.

3. The combination, with a cage, of the pivoted platform $g$, notched as described, guide-posts $c\ c$, having cut-away portions $c'\ c'$, inclined-faced blocks $h\ h$, loosely arranged in vertical guides upon opposite sides of the shaft, and means, such as the pivoted bar $h^3$, for alternately reversing the position of said blocks, substantially as shown and described.

4. The combination, with a cage, of the hinged covers $k\ k$ and means for normally retaining the same in a horizontal position, substantially as shown and described.

In testimony whereof we have signed this specification, in the presence of two subscribing witnesses, this 15th day of May, 1889.

BURT RUSSELL.
HARRY T. PARSONS.

Witnesses:
WM. HARDY,
GEORGE H. POPE.